United States Patent Office 3,296,200
Patented Jan. 3, 1967

3,296,200
EPOXIDE AZIRIDINE COMPOUNDS AND COATED ARTICLES MADE THEREFROM
Arthur A. Sommerville, Stewart Manor, and John J. R. Luzzi, Freeport, N.Y., assignors to Interchemical Corporation, New York, N.Y., a corporation of Ohio
No Drawing. Filed May 11, 1962, Ser. No. 194,163
2 Claims. (Cl. 260—47)

This invention relates to compounds of 2-methylaziridine or other imines with epoxide resins.

It was found that useful thermosetting, self-curing cationic resins could be made by reacting one molar equivalent of an alkylenimine with one molar equivalent of a commercial epoxide resin, such as one that is a reaction produce of epichlorohydrin and 2,2-bis(parahydroxyphenyl)propane. These novel compounds can be made at 50° C. in benzene solution, for example. Infrared analysis shows that a ring-opening reaction takes place.

A typical structure may be represented by the formula

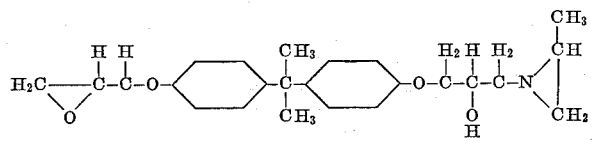

Tough, adhesive coatings can be made from the new compounds.

EXAMPLE 1

20 g. of "Epon 828" in 100 cc. benzene was prepared as solution "A" and 20 g. of 2-methyl aziridine as solution "B." A mixture of 20 cc. A and 3 cc. of solution B was examined by infrared spectroscopy. No change was noticed after the solution had stood one week at room temperature. It was then maintained at a temperature of 42° C. overnight, without any change being detectable. When the solution was subjected to a tempertaure of 50° C. for 60 hours it was observed that a ring-opening reaction had taken place. Analysis then showed that half the epoxy group had been consumed.

EXAMPLE 2

800 g. of "Epon 828" was made up to 4000 cc. with benzene (about 3300 cc. benzene were required). 123 g. 2-methyl aziridine were added and the mixture heated at 50° C. for one week. Evaluation showed that one-half the epoxide groups had been consumed. The solution was then split into two parts, one a control, the other for further processing. The latter was subjected to vacuum stripping until 625 g. remained in the flask. This represented about 75% solids and 25% benzene. The material gelled on standing overnight. The control was then drawn down on three glass panels and each one treated in a different way, as follows;

(1) Was air dried,
(2) Was cured 30 minutes at 300° F.,
(3) Was cured 10 minutes at 400° F.

The panels were then washed with acetone, with these results,
(1) The coating washed away,
(2) and (3) were unaffected except for some blushing. After soaking overnight in toluene and acetone (2) and (3) were not affected.

EXAMPLE 3

400 g. "Epon 828" in 1650 cc. benzene produced 2000 cc. of solution. 61.5 g. of 2-methyl aziridine were added and the solution heated one week at 50° C. The material was then stripped at 50–55° C. under a vacuum of 20–28 mm. of mercury. The yield was 1900 g. containing 24.3% of solids (462 g.).

Coatings were made with the product and compared to coatings made with "Epon 1001" catalyzed with 10% diethylene triamine. Both samples were coated on panels of tinplate and 3 panels of each were subjected to different baking schedules: (A) 10 minutes at 250° F., (B) 4 minutes at 350° F., and (C) 2 minutes at 400° F. The results are tabulated in Table I.

Flexibility was tested on the conical mandrel. The steam processing test was exposure to steam at 250° F. for 1 hour. The detergent test was the standard G.E. formulas at 165° F. The gentian violet test for degree of thermosetting is performed by placing a drop of gentian violet solution, comprising a mixture of solvents, on the cured coating for 15 seconds and then wiping dry with a cloth. The degree of attack, or staining indicates the degree of cure.

"Epon 828" has an epoxide equivalent of 192 and a melting point of 9° C. "Epon 1001" has an epoxide equivalent of 450–525 and a melting point of 64°–76° C. Both are reaction products of epichlorohydrin and 2,2-bis(parahydroxyphenyl) propane. Such epoxide resins may be prepared by heating together epichlorohydrin and dihydric phenolic compounds such as bisphenol A at 90°–100° C. in the presence of an alkaline catalyst. Such preparation is described in chapter 10 of "Copolymer Process," edited by C. E. Schildknecht, 1956. Two moles of epichlorohydrin reacted with one mole of bisphenol A give a liquid condensate of low molecular weight. Increasing the ratio of bisphenol A produces an increase in the molecular weight. After curing, the epoxide resins have many useful commercial applications in protective coatings, adhesives, etc.

Some of the imines suitable for the compounds of this invention may be represented by the formula

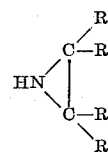

where R is selected from the group consisting of H, $CH_3$, and $C_2H_5$. Other imines are also suitable, even those of fairly complex structure.

Table 1

| Sample | Bake | Flexibility | Resistance to Steam Processing | Detergent Resistance | | | Resistance to Gentian Violet |
|---|---|---|---|---|---|---|---|
| | | | | 24 hrs. | 96 hrs. | 168 hrs. | |
| "Epon 1001" Catalyzed with 10% Diethylene Triamine. | (A) | Not good | Good | Poor | | | Stained. |
| Do | (B) | Good | do | No change | No change | Pitted | Do. |
| Do | (C) | do | do | do | do | do | Do. |
| Example 3 | (A) | do | do | do | do | Hazy | No Change. |
| Do | (B) | do | do | do | Slight Change | Pitted | Do. |
| Do | (C) | do | do | do | No Change | do | Do. |

What is claimed is:
1. A self-curing thermosetting compound comprising the reaction product of
(a) One molar equivalent of an imine having the structure

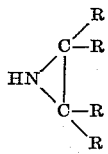

where R is selected from the group consisting of H, $CH_3$, and $C_2H_5$ with
(b) one molar equivalent of a diepoxide resin which is the reaction product of
  (1) epichlorohydrin, and
  (2) a bis(hydroxyphenyl) alkane, the thermosetting compound having approximately half as many epoxide groups as originally present in the diepoxide resin.

2. The compound described in claim 1 wherein the imine is propylenimine and the diepoxide resin has an epoxide equivalent of about 192.

References Cited by the Examiner
UNITED STATES PATENTS

| | | | |
|---|---|---|---|
| 2,296,225 | 9/1942 | Ulrich et al. | 260—2 |
| 2,901,443 | 8/1959 | Starck et al. | 260—47 |
| 3,171,826 | 3/1965 | Pepis et al. | 260—47 |

SAMUEL H. BLECH, *Primary Examiner.*
WILLIAM H. SHORT, *Examiner.*
T. D. KERWIN, *Assistant Examiner.*